United States Patent [19]
Erickson et al.

[11] Patent Number: 4,812,550
[45] Date of Patent: Mar. 14, 1989

[54] PREPARATION OF LATICES

[75] Inventors: David E. Erickson, Stow, Ohio;
Thomas F. Reed, Andover, Mass.

[73] Assignee: GenCorp Inc., Akron, Ohio

[21] Appl. No.: 31,976

[22] Filed: Mar. 30, 1987

[51] Int. Cl.$^4$ .................. C08H 1/00; C08F 289/00
[52] U.S. Cl. ................................. 527/201; 523/319
[58] Field of Search ............... 530/407, 378; 106/124, 106/154.1; 426/656; 527/201, 200; 523/319

[56] References Cited

U.S. PATENT DOCUMENTS 3,301,810  1/1967  Hunter et al. ..................... 523/300
4,607,089  8/1986  Riley et al. ........................ 527/201

Primary Examiner—John Kight
Assistant Examiner—Nathan M. Nutter

[57] ABSTRACT

Continuous ultrasonic irradiation during the free radical aqueous graft or over copolymerization of an unsaturated monomer on a protein provides a latex of reduced viscosity and increased solids content.

7 Claims, No Drawings

PREPARATION OF LATICES

This invention relates to grafted protein latices.

Protein modified paper latex is a binder which contains no surfactant, and in which the protein often used in paper coating formulations is already incorporated in the latex. Although some property improvements were found with this new product, some problems developed. When produced at solids contents greater than 31–32 percent, the latices had high viscosities. The high viscosity presents problems during latex manufacturing (poor heat transfer) as well as difficult subsequent pumping, etc. In addition, the low solids and/or high viscosity of those latices were considered a hindrance to their commercialization. The latex viscosities were reported to drop somewhat on aging; also, somewhat lower viscosities were obtainable uusing incrementing of protein solutions and monomers. However, the practical solids limit still could not be raised above 34–35 percent.

OBJECTS

An object of this invention is to avoid the difficulties alluded to above and to provide a method for making a grafted protein latex having reduced viscosity and increased solids content.

Another object of this invention is to provide a grafted protein latex having reduced viscosity and increased solids content.

These and other objects and advantages of this invention will become more apparent to those skilled in the art from the following detailed description and working example.

SUMMARY OF THE INVENTION

According the the present invention it has been found that latices employing proteins as emulsifying/suspending agents can be made to lower viscosities by continuously irradiating the aqueous mixture with ultrasonic energy during the course of graft copolymerization. Because of this beneficial effect on viscosity, such latices can be prepared at higher solids content than normally are practical without the ultrasonic treatment. Viscosity reduction is presumably caused by a partial deagglomeration of particle groupings observed in the protein modified latices.

DISCUSSION OF DETAILS AND PREFERRED EMBODIMENTS

The graft copolymerization is done in alkaline aqueous media. The protein is dissolved or rendered finely divided (colloidal suspension) in aqueous ammonium hydroxide or other suitable aqueous alkaline material before polymerization is initiated by an azo initiator. In the graft copolymerization the polymerizable unsaturated monomer is used in an amount of from about 90 to 70 parts by weight and the protein is used in an amount of from 10 to 30 parts by weight, the total of the ingredients being 100 parts by weight. In this graft polymerization process, added emulsifiers, colloids or surfactants are not needed.

Proteins, of course, in various forms are well know material's and have many uses. Please see "Encyclopedia of Polymer Science and Technology," John Wiley & Sons, Inc., Vol.2 (1965), Vol. 8 (1968), Vol. 9 (1968), Vol. 11 (1969) and Supplement Vol. 2 (1977).

For example, they may be obtained as hydrolyzed collagen from fish and animal skin and bones, as albumen from blood and egg white, as casein from milk, as the gluten fractions from corn and wheat and/or the proteins derived from seeds and like such as soy beans, e.g., soy protein (preferred).

The polymerizable monomers to be grafted to or over copolymerized with the protein have not over 14 carbon atoms. Examples of such monomers are the conjugated dienes like piperylene, butadiene-1,3, isoprene, 2,3-dimethyl butadiene, chloroprene and the like; a nitrile like acrylonitrile, methacrylonitrile; an amide like acrylamide, methacrylamide and ethacrylamide; an acrylate like methyl acrylate, ethyl acrylate, butyl acrylate, ethyl hexyl acrylate and octyl acrylate; an alkacrylate like methyl methacrylate, ethyl methacrylate, butyl methacrylate, methyl ethacrylate, ethyl ethacrylate, butyl ethacrylate, hydroxyethyl methacrylate and octyl ethacrylate; a vinyl aryl monomer like styrene, alpha methyl styrene, p-tertiary butyl styrene, divinyl benzene, methyl vinyl toluene and para vinyl toluene; a pyridine like 2-vinyl pyridine, 4-vinyl pyridine, 2-methyl-5-vinyl pyridine and 5-ethyl-2-vinyl pyridine; and the like and mixtures thereof.

A chelating agent is used in a very minor amount sufficient to chelate any interfering ions such as the ferric or ferrous ion, or other polymerization interfering ion or material. In general it is used in an amount of from about 0.01 to 1.0, preferably about 0.05, part by weight per 100 parts by weight of the monomer(s) and protein. Examples of some chelating agents are trisodium ethylene diamine tetraacetate dihydrate (preferred), ethylenediaminetetraacetic acid tetrasodium salt, technical ethylenediaminetetraacetic acid tetrasodium salt, ethylenediaminetetraacetic acid tetrasodium salt dihydrate, ethylenediaminetetraacetic acid trisodium salt monohydrate, ethylenediaminetetraacetic acid disodium salt dihydrate, ethylenediaminetetraacetic acid, nitrilotriacetic acid disodium salt monohydrate, nitrilotriacetic acid, N-hydroxyethyl-ethylenediaminetriacetic acid trisodium salt, N-hydroxyethyl-ethylenediaminetriacetic acid trisodium salt dihydrate, ethanoldiglycine disodium salt (or disodium N-hydroxyethyliminodiacetic acid), diethanolglycine sodium salt (or sodium dihydroxyethyl glycine) and the like and mixtures of the same.

The initiator or catalyst used is an oil soluble azo initiator or catalyst. Azo initiators for free radical polymerization are well known. In this connection please see the "Encyclopedia Of Polymer Science And Technology," Vol. 2, 1965, pages 278–295, John Wiley & Sons, Inc. Of these initiators it is preferred to use the azonitriles. Examples of some of these compounds are azobisdimethylvaleronitrile, 2,2'-azobisisobutyronitrile (preferred), 2,2'-azobis-2-methylbutyronitrile and 2,2'-azobis (methylisobutyrate) and the like and mixtures of the same. Only minor amounts by weight of the initiator are necessary to effect copolymerization.

Chain transfer agents or modifiers are used during the graft copolymerization to control molecular weight, gel and so forth. While various modifiers or chain transfer agents have been proposed and may be used such as benzene, toluene, triphenyl methane, carbon tetrachloride and so forth, it is preferred to use mercaptans such as the alkyl and/or aralkyl mercaptans of from 8 to 18 carbon atoms of which the tertiary alkyl mercaptans are much preferred. Examples of some mercaptans are n-octyl mercaptan, n-dodecyl mercaptan, t-octyl mercaptan, t-dodecyl mercaptan (also preferred), p-tridecyl mercaptan, tetradecyl mercaptan, hexadecyl mercaptan and so forth and mixtures thereof. These modifiers are used generally in a total amount of from about 0.15 to 0.9 phm (parts 100 parts monomer).

Temperatures used during graft copolymerization should be sufficient to effect polymerization by activation of the catalyst and double bonds of the monomer(s). They should not be too high to cause a runaway reaction and not too low to retard polymerization. In general, the temperature is preferably from about 40° to 80° C. Times for polymerization may vary from about 8 to 14 hours depending on the degree of polymerization desired. Generally, it is desired to carry polymerization to about 100% conversion.

The graft copolymerization should be conducted under alkaline conditions utilizing materials like $NH_4OH$ and the like. In general the pH of the polymerization media should be from about 8.5 to 10, preferably from about 9 to 9.5.

The water used during graft copolymerization should be free of deleterious materials and preferably should be distilled or ion exchanged. Sufficient water is used to enable maintenance of the emulsion or latex and to enable proper mixing or stirring of the ingredients during polymerization to obtain the desired rate and degree of polymerization, heat transfer and so forth. The solids content may be up to about 40% by weight.

Graft copolymerization should be conducted in a closed reactor, such as a pressure reactor, fitted with a stirrer or other agitating means, evacuating means, heating and cooling means, with means to flush with or pump in an inert gas such as nitrogen, helium, argon, neon and the like if desired, with means to charge monomer(s), protein, water, initiators, venting means, and with means to recover the polymer and so forth. The reactor should be cleaned or flushed between polymerization runs to remove traces of initiators, modifiers, residues and so forth which might interfere with subsequent polymerizations. There should be sufficient agitation or stirring of the polymerization media to ensure thorough mixing, diffusion, contact and so forth. Inadequate stirring caused by the use of too small impeller blades may result in incomplete sonication, causing extremely high latex viscosities, poor heat transfer and exotherms which can result in latex agglomeration. The schedule of sonication required in a given situation may depend on the heat transfer and agitation available, as well as on the reactivity of the particular monomers employed.

Free radical aqueous polymerization and copolymerization of ethylenically unsaturated monomers are well known to those skilled in the art. In this connection please see Whitby et al, "Synthetic Rubber," John Wiley & Sons, Inc., New York, 1954; Bovey et al, "Emulsion Polymerization," High Polymers, Vol. IX, Interscience Publishers, Inc., 1955; Schildknecht, "Vinyl and Related Polymers," John Wiley & Sons, Inc., New York, 1952 and "Encyclopedia of Polymer Science and Technology," Vol. 3 (1965), Vol. 5 (1966), Vol. 7 (1967), Vol. 9 (1968) and Vol. 11 (1969), Interscience Publishers, a division of John Wiley & Sons, Inc., New York.

In the practice of the present invention, the polymerization may be considered as a graft copolymerization, over copolymerization, core/shell copolymerization or an interpolymerization. The technique of polymerizing or copolymerizing one or more monomers in the presence of a polymer or a substrate, "grafting technique," is known and is frequently called graft polymerization or graft copolymerization. In this connection, please see "Proceedings Of The Third Rubber Technology Congress," 1954, W. Heffer & Sons, Ltd., Cambridge, pages 185-195; "Copolymerization," High Polymers, Vol. XVIII, Ham, Interscience Publishers a division of John Wiley & Sons, New York, 1964; "Block and Graft Polymers," Burlant and Hoffman, Reinhold Publishing Corporation, New York, 1960; "Block and Graft Copolymers," Ceresa, Butterworth & Co. (Publishers) Ltd., London, 1962; "Block and Graft Copolymerization," Ceresa, Vol. 1 (1973) and Vol. 2 (1976), John Wiley & Sons, Ltd., New York and "Graft Copolymers," Polymer Reviews, Vol. 16, Battaerd and Tregear, Interscience Publishers, a division of John Wiley & Sons, New York, 1967. The graft copolymer may contain all graft copolymer but also may be a mixture of homopolymers, copolymers as well as the graft itself, depending on the rate of polymerization of the monomer(s), the polymerization conditions and so forth.

The graft copolymer latices of the present invention can be treated during or after polymerization with antioxidants, biocides, defoamers, additional alkaline material such as $NH_4OH$ and so forth.

All of the graft copolymerization ingredients may be charged to the reactor at once and graft copolymerization continued to completion or a seed type of latex may be formed by first graft copolymerization of part of the monomer(s) on the protein in the presence of some of the polymerization materials followed by further additions of monomers along with the remaining polymerization materials.

The latices of the present invention can be mixed with finely divided fillers such as paper coating fillers like clays, kaolin, calcium carbonate, titanium dioxide, zinc oxide and other inorganic fillers used in paper coating compositions. Thickening agents, viscosity stabilizers, additional alkaline material like $NH_4OH$ and so forth can be added to these compositions. In general paper coating compositions of the present invention will have a solids content of from about 20 to 70% by weight. The solids comprising from about 2 to 20% by weight, on a dry weight basis, of the graft copolymer and from 98 to 80% by weight of the paper coating fillers. The paper coating composition may be spread on paper and hot calendered to cure or set the graft copolymer and form an adherent and dried coating on the paper. For example, in some paper coating latices an acid containing comonomer is used, but, here, such a —COOH containing monomer is not needed. In using the latex in a paper coating composition additional cobinder is not required. The latex is useful as a binder for pigmented paper coating compositions to be printed by gravure or offset printing processes and is particularly useful in compositions for lightweight paper to be printed by the gravure process. The latex, also, can be used in compositions for cylinder boards.

The following example will serve to illustrate the present invention with more particularity to those skilled in the art. In the example the parts are parts by weight unless otherwise indicated.

EXAMPLE

All latices were prepared under a laboratory hood in a 1500 cc stainless steel resin kettle or reactor which was modified with an inclined side tube into which an ultrasonic probe was inserted. The side tube was placed so as to insure that the tip of the probe was about one-half inch below the surface of the internal liquid when 1000 cc of liquid was in the reactor. The ultrasonic unit was a Branson Sonifier Model S75 (Branson Instrument Company) which delivers a 75 watt, 20,000 Hz (Hertz) signal from a 1.27 cm diameter cylindrical probe inserted into the polymerization media.

The polymerization reactor was partly immersed (to above the internal liquid level) in a constant temperature bath. The polymerization runs were all made at 65° C. (±1.C.). The bath temperature was controlled at temperatures slightly below 65° C. to maintain internal reactor temperature at that temperature because of heat of reaction and the heat developed in the liquid due to the ultrasonic energy. All contents of the reactor were stirred at 460–560 rpm using a shaft with two impeller blades, one above the tip of the ultrasonic probe and one near the bottom of the reactor.

Nitrogen was continuously bubbled through the reaction mixtures using a dip tube. This resulted in small losses of monomers during the five to six hour polymerization runs.

Viscosity measurement was made with a Haake Rotovisco RV100 viscometer using the NV rotor and cup at shear rates between 117 sec$^{-1}$ and 2700 sec$^{-1}$ (ramping between shear rates, 5.0 minutes). The Brookfield LVF viscometer (60 rpm, varying spindle size), also was used.

Protein solubilization, normally to 20% by weight, was done by wetting out the dry protein for a few minutes in water, adding the proper amount of 28% ammonia to give a final pH of 9–9.5 and heating the mixture while agitating vigorously for 30 minutes. 14 parts 28% $NH_3$/100 parts PC 200LV and 20 parts 28% $NH_3$/100 parts of PC 400 or PP 2500 were used in the solubilization.

All of the latices were polymerized using the same basic recipe, but with variations in type of protein, amount of water and type of acrylate monomer. Also, the method of protein solubilization was varied.

The tables show which acrylate monomer was used, and the incrementing scheme for the protein and monomer solutions. Also, in three of these runs the protein was solubilized directly in the reactor rather than externally at about 20 percent solutions, but the times and temperatures used in the solubilization were similar in the different procedures.

TABLE I

GENERAL RECIPE FOR PREPARATION OF PROTEIN MODIFIED STYRENE-ACRYLATE LATICES

| INGREDIENT | PARTS (DRY. ACTIVE) |
|---|---|
| Styrene | 40 |
| Acrylate Monomer | 41.5 |
| Protein (Ammonia Solubilized) | 18.5* |
| SULFOLE 120 | 0.45 |
| VAZO 64 | 0.6 |
| SEQUESTRENE Na$_3$ | 0.05 |
| DREW L-198 | 0.10 |
| Distilled, Deionized Water | to 31.9 or 40% solids. |
| SEQUESTRENE Na$_3$ | Trisodium ethylene diamine tetraacetate dihydrate. Ciba-Geigy Corp. |
| SULFOLE 120 | t-dodecyl mercaptan, avg. mol. wt. 198, calc. purity wt. % 96.8 and mercaptan sulfur wt. % 15.4. Phillips Petroleum Co., Rubber Chem. Div. |
| DREW L-198 | Emulsifiable mixture of mineral oil, silica derivatives and esters. Defoamer. Drew Chemical Corp. |
| PROXEL GXL | Chemical biocide. ICI Americas Inc. |
| VAZO 64 | 2,2'-azobisiobutyronitrile or $(CH3)_2(CN)CN=NC(CN)(CH3)_2$, duPont. |

The VAZO was added as a solution in the styrene, and the SULFOLE was dissolved in the acrylate used.
*The protein solutions were made to contain 1.08 g. PROXEL GXL/100 g. protein to protect against bacterial attack.

TABLE II

POLYMERIZATION SCHEME AND RHEOLOGY - PROTEIN MODIFIED STYRENE ACRYLATE LATICES - EFFECT OF SONICATION

| RUN NO. | ACRYLATE MONOMER | PROTEIN | ULTRASONIC TREATMENT |
|---|---|---|---|
| 1 | butyl acrylate | PP2500[1] | No |
| 2 | butyl acrylate | PP2500[1] | Yes[4] |
| 3 | butyl acrylate | PP2500[1] | Yes[4] |
| 4 | butyl acrylate | PP2500[1] | Yes[4] |
| 5 | butyl acrylate | ProCote 200LV[1] | Yes[4] |
| 6 | butyl acrylate | ProCote 400[1] | Yes[4] |
| 7 | 2-ethyl hexyl acrylate | ProCote 400[1] | Yes[4] |
| 8 | 2-ethyl hexyl acrylate | PP2500[2] | Yes[5] |
| 9 | 2-ethyl hexyl acrylate | PP2500[3] | Yes[5] |
| 10 | 2-ethyl hexyl acrylate | ProCote 200LV[2] | Yes[5] |
| 11 | 2-ethyl hexyl acrylate | ProCote 200LV[2] | No |

| RUN NO. | PROTEIN WT. FRACTION INCREMENTED | | MONOMERS WT. FRACTION INCREMENTED | | |
|---|---|---|---|---|---|
| | 0 Hr. | 1 Hr. | 0 Hr. | 1 Hr. | 2 Hr. |
| 1 | 1 | — | 1 | — | — |
| 2 | 1 | — | 1 | — | — |
| 3 | .55 | .45 | .62 | .38 | — |
| 4 | 1 | — | .33 | .33 | .33 |
| 5 | .55 | .45 | .62 | .38 | — |
| 6 | .55 | .45 | .62 | .38 | — |
| 7 | .55 | .45 | .62 | .38 | — |
| 8 | 1 | — | .33 | .33 | .33 |
| 9 | 1 | — | .33 | .33 | .33 |
| 10 | 1 | — | .33 | .33 | .33 |
| 11 | 1 | — | .33 | .33 | .33 |

Haake Viscosities (NV Rotor) in mPa sec at Different Shear Rates

| Run No. | 117 Sec$^{-1}$ | 270 Sec$^{-1}$ | 1082 Sec$^{-1}$ | 1170 Sec$^{-1}$ | 2700 Sec$^{-1}$ |
|---|---|---|---|---|---|
| 1 | | 139 | 76.1 | | 53.3 |
| 2 | | 21.9 | 18.7 | | 16.9 |
| 3 | | 125 | 76.5 | | 56.8 |
| 4 | | 195 | 107 | | 72 |
| 5 | | 102 | 64.1 | | 49.1 |
| 6 | | 172 | 98.9 | | 69.2 |
| 7 | | 183 | 99.6 | | 68.5 |
| 8 | | 150 | 85.5 | | 60.5 |
| 9 | | 139 | 81.1 | | 57.8 |
| 10 | | 105 | 63.8 | | 47.7 |
| 11 | 1038[6] | | | 223 | |

| RUN | BROOKFIELD VISCOSITY | SOLIDS CONTENT |
|---|---|---|

TABLE II-continued
POLYMERIZATION SCHEME AND RHEOLOGY - PROTEIN MODIFIED STYRENE ACRYLATE LATICES - EFFECT OF SONICATION

| NO. | (LVF, 60 rpm) | (%) 7 |
| --- | --- | --- |
| 1 | 700 | 30.5 |
| 2 | 28.2 | 30.7 |
| 3 | 467 | 37.3 |
| 4 | 1140 | 37.3 |
| 5 | 315 | 37.5 |
| 6 | 850 | 38.0 |
| 7 | 930 | 38.9 |
| 8 | 700 | 38.6 |
| 9 | 710 | 39.3 |
| 10 | 356 | 37.3 |
| 11 | 6600 | 38.0 |

[1] Proteins added as 20% solutions.
[2] Proteins solubilized in reactor, at ca. 11% solids, all water in charge was included.
[3] Protein solubilized in reactor, at ca 19% solids, then remainder of water in initial charge was added.
[4] Sonication began immediately after initial monomers addition, continued during entire run.
[5] Sonication conducted both during protein solubilization and polymerization run.
[6] The high viscosity of this latex required use of a different rotor, MVI, than used in the remainder of the latices; this system did not permit evaluation at high shear rates.
[7] Solids content at end of polymerization. mPa-millipascal.

All proteins were soy proteins obtained as granular solids from The Ralston Purina Company, St. Louis, Mo. Ralston Purina Company Polymer PP2500 is an anionic carboxylated soy protein in powder form. At 20% solids in alkaline media it has a Brookfield viscosity of about RVT (10 RPM) at 25° C. See U.S. Pat. No. 4,474,694.

RESULTS The latices obtained were very similar in appearance and properties. The two low solids latices (Runs 1 and 2) were formulated to reach a solids content of 31.9 percent, but actual final solids contents attained in 5–6 hours were only about 30.5 percent because of monomer loss with the nitrogen stream and also because of incomplete conversions. Likewise, the higher solids latices were formulated to reach 40 percent solids at complete conversion but actually only attained 37.3–39.3 percent solids.

The Brookfield and Haake Rotovisco viscosity results are also summarized in Table II. The ultrasonic treatment during polymerization was shown to cause final low shear Brookfield viscosities to be from 15 to 25 times lower than obtainable without the treatment. This is shown in the two direct comparisons made (latex 2 vs. 1 and latex 10 vs. 11). These two comparisons have demonstrated that the treatment is effective in both high and lower solids latex polymerizations. The Haake Rotovisco results, also, show that the latices prepared using ultrasound are lower in viscosity at higher shear rates, but that the viscosity difference is less pronounced (i.e., only a factor of about four).

High viscosity protein graft SBR latices can be reduced in viscosity by ultrasonic treatment, and the viscosity reduction seems to be related to the deagglomeration of particle groupings present in the high viscosity latices. Similarly, here, the viscosity of the latices produced without sonication can be reduced by a single 20 minute ultrasonic treatment to about the same level as attained with the continuous ultrasonic treatment. However, without ultrasonic treatment during polymerization the high viscosity of the latex can still present problems of heat transfer and temperature control.

We claim:

1. The method which comprises graft copolymerizing or over copolymerizing on a solubilized protein at last one copolymerizable unsaturated monomer having not over 14 carbon atoms and being selected from the group consisting of conjugated dienes, nitriles, amides, acrylates, alkacrylates, vinyl aryl monomers and vinyl pyridines in aqueous alkaline media using a free radical azo catalyst while continuously ultrasonically irradiating the aqueous alkaline media during the course of the polymerization to provide a latex of reduced viscosity and increased solids content, where on a dry weight basis
   (a) said unsaturated monomer is used in an amount of from about 90 to 70 parts by weight and
   (b) said protein is used in an amount of from 10 to 30 parts by weight, the sum of (a) and (b) being 100 parts by weight.
2. The method according to claim 1 where said protein is a soy protein.
3. The mtthod according to claim 1 where said monomer and said protein have been added incrementally during the course of the graft or over copolymerization.
4. The product produced by the method of claim 1.
5. The product produced by the method of claim 2.
6. The product produced by the method of claim 3.
7. An aqueous alkaline latex of a graft of at least one unsaturated monomer having not over 14 carbon atoms on a protein, said latex made by continuously applying ultrasonic irradiation during the course of the polymerization of the aqueous alkaline latex, said latex exhibiting reduced viscosity and increased solids content and said monomer being selected from the group consisting of conjugated dienes, nitriles, amides, acrylates, alkacrylates, vinyl aryl monmers and vinyl pyridines, where on a dry weight basis,
   (a) said unsaturated monomer is used in an amount of from about 90 to 70 parts by weight and
   (b) said protein is used in an amount of from 10 to 30 parts by weight, the sum of (a) and (b) being 100 parts by weight.

* * * * *